(12) United States Patent
Li

(10) Patent No.: US 12,353,794 B2
(45) Date of Patent: Jul. 8, 2025

(54) DYNAMIC LED LIGHT STRING CAPABLE OF PLAYING MUSIC

(71) Applicant: LINHAI SHUNSHENG DECORATIVE LIGHTING CO., LTD, Taizhou (CN)

(72) Inventor: Hua Li, Chenxi (CN)

(73) Assignee: LINHAI SHUNSHENG DECORATIVE LIGHTING CO., LTD, Taizhou (CN)

( * ) Notice: Subject to any disclaimer, the term of this patent is extended or adjusted under 35 U.S.C. 154(b) by 0 days.

(21) Appl. No.: 18/890,831

(22) Filed: Sep. 20, 2024

(65) Prior Publication Data

US 2025/0013428 A1    Jan. 9, 2025

(51) Int. Cl.
| | |
|---|---|
| *H04R 1/02* | (2006.01) |
| *G06F 3/16* | (2006.01) |
| *H04R 3/00* | (2006.01) |
| *H05B 47/115* | (2020.01) |
| *G01S 13/04* | (2006.01) |

(52) U.S. Cl.
CPC ............. *G06F 3/165* (2013.01); *H04R 1/028* (2013.01); *H04R 3/007* (2013.01); *H05B 47/115* (2020.01); *G01S 13/04* (2013.01); *H04R 2430/01* (2013.01)

(58) Field of Classification Search
CPC .... H04R 1/028; H04R 3/007; H04R 2430/01; H04R 3/00; H04R 1/1041
USPC ...................................... 381/55, 58, 107, 124
See application file for complete search history.

(56) References Cited

U.S. PATENT DOCUMENTS

| | | | |
|---|---|---|---|
| 8,534,375 B2* | 9/2013 | Matsumoto | B25F 5/02 173/171 |
| 9,967,928 B2* | 5/2018 | Harris | H05B 45/37 |
| 11,336,477 B2* | 5/2022 | Jones | H04N 21/4325 |
| 11,856,671 B1* | 12/2023 | DeLano | H05B 47/16 |
| 12,096,886 B2* | 9/2024 | Souris | H05B 1/0252 |
| 2008/0278966 A1 | 11/2008 | Li | |
| 2009/0046461 A1 | 2/2009 | Fan | |
| 2012/0032587 A1 | 2/2012 | Shih | |
| 2022/0386435 A1* | 12/2022 | Bessems | H05B 47/12 |
| 2024/0318809 A1* | 9/2024 | Fannin | F21V 19/0035 |

* cited by examiner

*Primary Examiner* — Disler Paul
(74) *Attorney, Agent, or Firm* — Hemisphere Law, PLLC; Zhigang Ma

(57) ABSTRACT

The present disclosure discloses a dynamic light-emitting diode (LED) light string capable of playing music. A connection seat where a light strip is arranged in a penetrating manner is arranged at a top of a controller; light beads are arranged on the light strip at intervals; a control module is arranged in the controller; the control module is electrically connected to the light strip and the light beads; the control module includes a radar sensing circuit, a power management circuit, a light string driving circuit, a music control circuit, and a protection circuit which are arranged on a printed circuit board (PCB) chip; the power management circuit is configured to supply power to other circuits; the radar sensing circuit is configured to sense whether a person is approaching and transmit corresponding electrical signals to the light string driving circuit and the music control circuit through the PCB chip.

6 Claims, 8 Drawing Sheets

DYNAMIC LED LIGHT STRING CAPABLE OF PLAYING MUSIC

TECHNICAL FIELD

The present disclosure relates to the technical field of decorative lamps, and in particular, to a dynamic light-emitting diode (LED) light string capable of playing music.

BACKGROUND

Light strings are widely used for indoor and outdoor decorations, and are essential ornaments for holiday celebration. The light string is mainly composed of a plurality of lamps connected in series in an electrical circuit. Each lamp is provided with a light bead, a lamp holder that fixes the light bead, and a connection seat that achieves electrical connection between the light bead and a wire. The light bead can be a tungsten filament lamp or an LED, and the plurality of lamps are connected in series to each other through wire segments with metal conductive terminals fixed at two ends.

A musical light string in the prior art usually receives a music signal through a microphone, thereby achieving the music rhythm of the light string. The musical light string has a small range of applications and cannot quickly sense the movement of a person to play music Moreover, it is inconvenient because a user needs to perform actions again to determine whether to stop the music.

SUMMARY

To solve the above technical problems, the present disclosure provides a dynamic LED light string capable of playing music. The dynamic LED light string includes a controller, a light strip, light beads, and a control module. A connection seat where a light strip is arranged in a penetrating manner is arranged at a top of a controller; light beads are arranged on the light strip at intervals; a control module is arranged in the controller; the control module is electrically connected to the light strip and the light beads; the control module includes a radar sensing circuit, a power management circuit, a light string driving circuit, a music control circuit, and a protection circuit which are arranged on a printed circuit board (PCB) chip; the power management circuit is configured to supply power to other circuits; the radar sensing circuit is configured to sense whether a person is approaching and transmit corresponding electrical signals to the light string driving circuit and the music control circuit through the PCB chip; the light string driving circuit receives the electrical signals from the radar sensing circuit and the music control circuit, converts the corresponding electrical signals into flashing frequencies of the light strip and the light beads through the PCB chip, and outputs the flashing frequencies; the music control circuit is configured to play preset music and adjust a playing volume; the protection circuit is configured to monitor the operation of the power management circuit; and if the power management circuit works abnormally, the supplying of power is cut off.

Preferably, the music control circuit includes a music switching circuit and a music playing circuit; the music switching circuit is configured to allow a user to select and switch currently played music; after the music is switched, the light string driving circuit controls and adjusts the corresponding flashing frequencies of the light strip and the light beads; the music playing circuit plays a piece of music when receiving an electrical signal indicating a movement of a person; the played music is repeated, and is switched through the music switching circuit; if the movement of the person is beyond a sensing range of the radar sensing circuit, the music playing circuit immediately cuts off the playing of the music; and the music playing circuit further adjusts the volume of the music.

Preferably, the model number a chip of the music control circuit is DJ01; and the model number of a chip of the light string driving circuit includes FC2502 and SA6208L.

Preferably, the controller is provided with a control button; the control button is respectively connected to the music switching circuit and the power management circuit; and the control button is pressed by a user to switch the played music, or to turn off the light string, the light beads and the music.

Preferably, the controller is provided with a hanging lug.

Preferably, the controller is provided with a Type-C charging port.

Preferably, there are at least two light strips arranged in parallel or helically into a strand.

Compared with the prior art, the present disclosure has the following beneficial effects:

In the present disclosure, the control module is arranged in the controller; the power management circuit on the control module is configured to supply power to other circuits; the radar sensing circuit is configured to sense whether a person is approaching and transmit corresponding electrical signals to the light string driving circuit and the music control circuit through the PCB chip; the light string driving circuit receives the electrical signals from the radar sensing circuit and the music control circuit, converts the corresponding electrical signals into flashing frequencies of the light strip and the light beads through the PCB chip, and outputs the flashing frequencies; the light string driving circuit and the power management circuit can be selected according to requirements for different input voltages, which is more convenient; the music control circuit is configured to play preset music and adjust a playing volume, so that it is convenient for a user to select music and volume; the protection circuit is configured to monitor the operation of the power management circuit; and if the power management circuit works abnormally, supplying of power is cut off to protect the control module.

In the present disclosure, the connection seat where the light strip is arranged in a penetrating manner is arranged at the top of the controller; the light beads are arranged on the light strip at intervals; and there are at least two light strips arranged in parallel or helically into a strand, so that the light strip and the light beads flash more regularly when controlled by the control module.

DETAILED DESCRIPTION OF THE EMBODIMENTS

The present disclosure will be further explained below in conjunction with the accompanying drawings and specific implementations.

Figure 1:
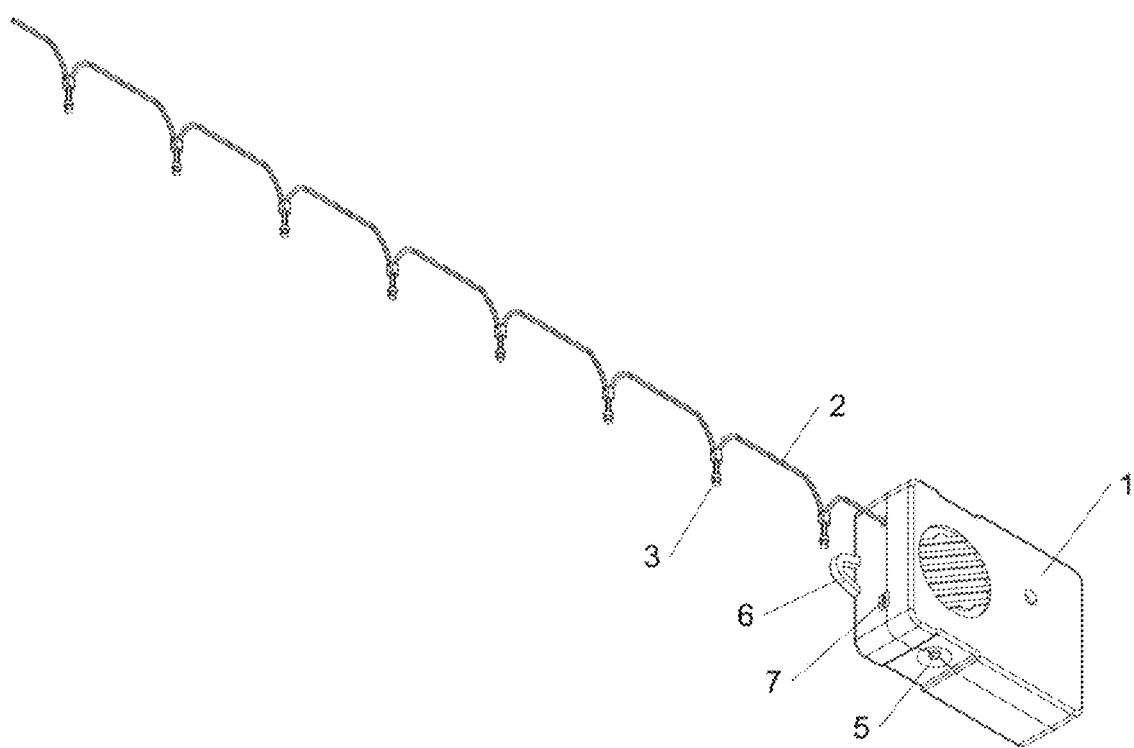
FIG. 1 is a schematic structural diagram I of the present disclosure.
Figure 2:
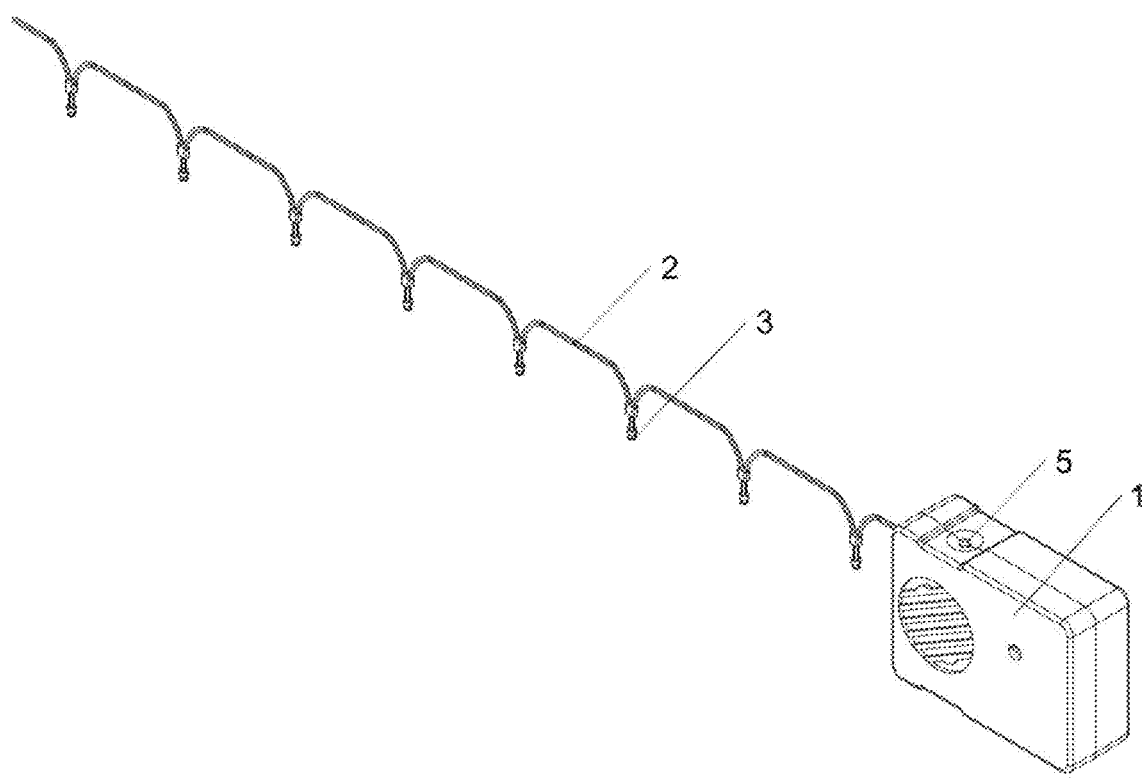
FIG. 2 is a schematic structural diagram II of the present disclosure.
Figure 3:
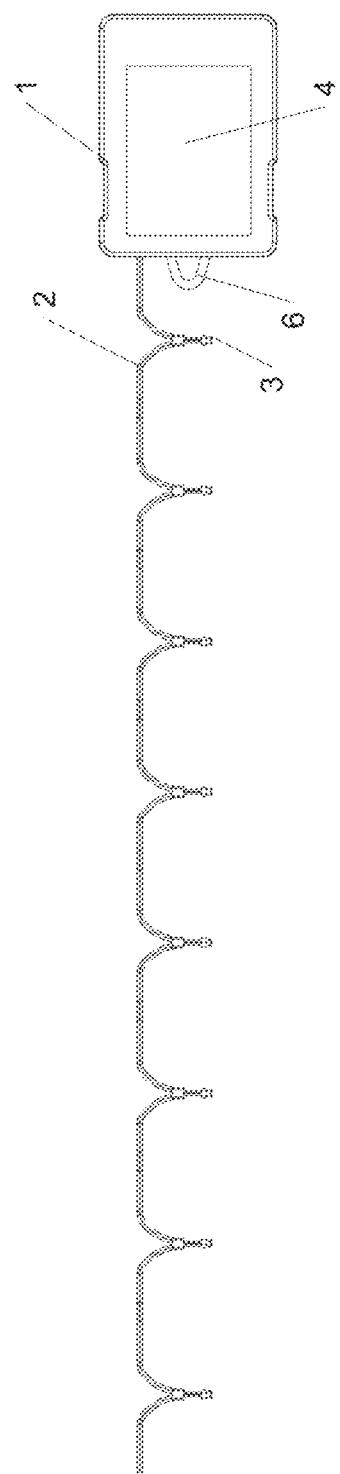
FIG. 3 is a schematic diagram of an internal structure of a controller of the present disclosure.

As shown in FIG. 1 to FIG. 3, a dynamic LED light string capable of playing music includes a controller 1, a light strip 2, light beads 3, a control module 4, a control button 5, a hanging lug 6, and a charging port 7.

In the description of the present disclosure, unless otherwise stated, "plurality" means two or more. Orientations or positional relationships indicated by the terms "upper", "lower", "left", "right", "inside", "outside", "front end", "rear end", "head part", "tail part" and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure. In addition, the terms "first", "second", "third", and the like are only for the purpose of description, and may not be understood as indicating or implying the relative importance.

In the description of the present disclosure, it should be noted that unless otherwise specified and limited, the terms "connect", and "connection" should be broadly understood. For example, it can be a fixed connection, detachable connection, integrated connection, mechanical connection, electrical connection, direct connection, or indirect connection via an intermediate element. For those of ordinary skill in the art, the specific meanings of the aforementioned terms in the present disclosure can be understood according to specific conditions.

As shown in FIG. 1 to FIG. 3, a connection seat where the light strip 2 is arranged in a penetrating manner is arranged at a top of the controller 1. There are at least two light strips 2 arranged in parallel or helically into a strand. The light beads 3 are arranged on the light strip 2 at intervals. The light strip 2 and the light beads 3 can be selected according to a length desired by a user. In this embodiment, the accompanying drawings show connection of eight light beads 3 for reference. The control module 4 is arranged in the controller 1. The control module 4 is electrically connected to the light strip 2 and the light beads 3, so that the light strip 2 and the light beads 3 flash more regularly when controlled by the control module 4.

The control module 4 includes a radar sensing circuit, a power management circuit, a light string driving circuit, a music control circuit, and a protection circuit which are arranged on a PCB chip. The power management circuit is configured to supply power to other circuits.

The radar sensing circuit is configured to sense whether a person is approaching. When sensing that there is a person moving, the radar sensing circuit automatically plays music; and when sensing that there is no person moving, the radar sensing circuit stops playing the music. When detecting that there is a person moving, the radar sensing circuit may output a high level to the PCB chip, to transmit an electrical signal to the light string driving circuit and the music control circuit through the PCB chip.

The model number of a chip of the light string driving circuit includes FC2502 and SA6208L. The light string driving circuit receives the electrical signals from the radar sensing circuit and the music control circuit, converts the corresponding electrical signals into flashing frequencies of the light strip 2 and the light beads 3 through the PCB chip, and outputs the flashing frequencies; the music control circuit is configured to play preset music and adjust a playing volume; the protection circuit is configured to monitor the operation of the power management circuit; and if the power management circuit works abnormally, supplying of power is cut off.

The model number of a chip of the music control circuit is DJ01. The music control circuit includes a music switching circuit and a music playing circuit. The music switching circuit is configured to allow a user to select and switch currently played music. After the music is switched, the light string driving circuit controls and adjusts the corresponding flashing frequencies of the light strip 2 and the light beads 3. The flickering of the light changes as the volume changes. A high volume reflects a high PWM duty cycle, and a low volume reflects a low PWM duty cycle.

Figure 4:
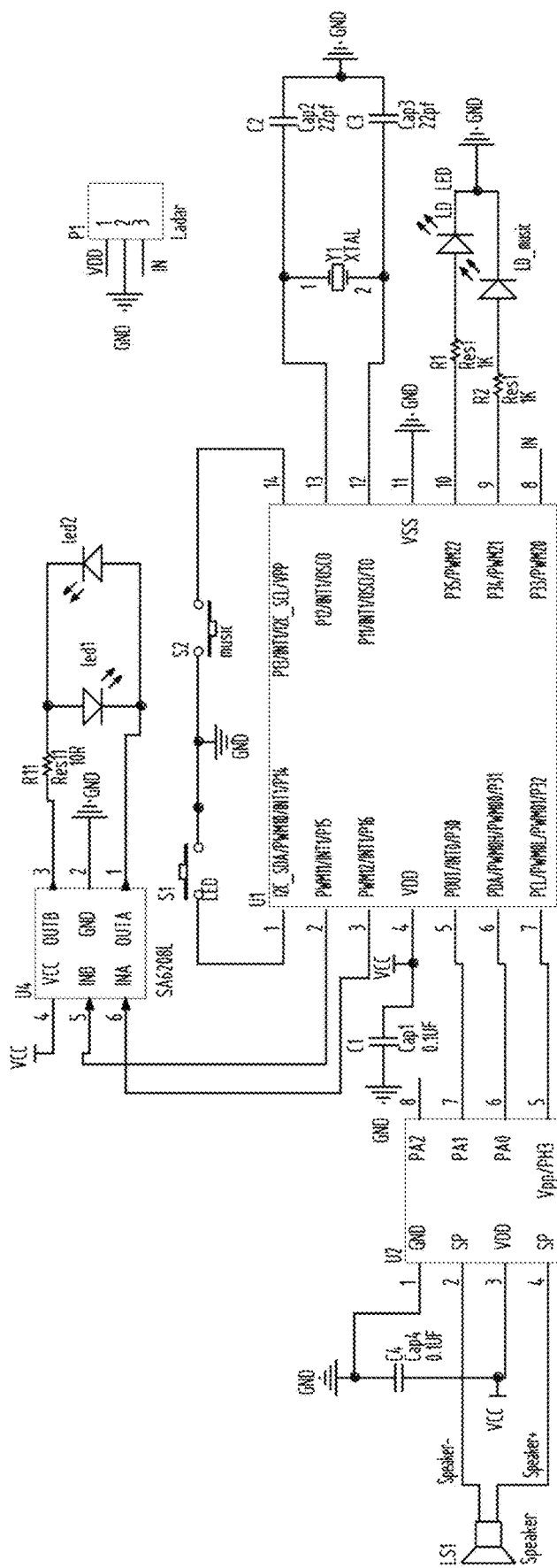
FIG. 4 is a schematic diagram of an overall circuit of the present disclosure when 5V is used for supplying power.

The music playing circuit plays a piece of music when receiving an electrical signal indicating a movement of a person; the played music is repeated, and is switched through the music switching circuit; if the movement of the person is beyond a sensing range of the radar sensing circuit, the music playing circuit immediately cuts off the playing of the music; and the music playing circuit further adjusts the volume of the music. Specifically, as shown in FIG. 4, U4 represents a current amplification circuit, and sound is set in U2. When the radar sensing circuit senses that there is a person moving, U2 drives the music playing circuit to make the speaker make a sound. U1 reads sound data and adjusts U4 according to the sound data. U4 receives an electrical signal to adjust the light strip 2 and the light beads 3.

Figure 5:
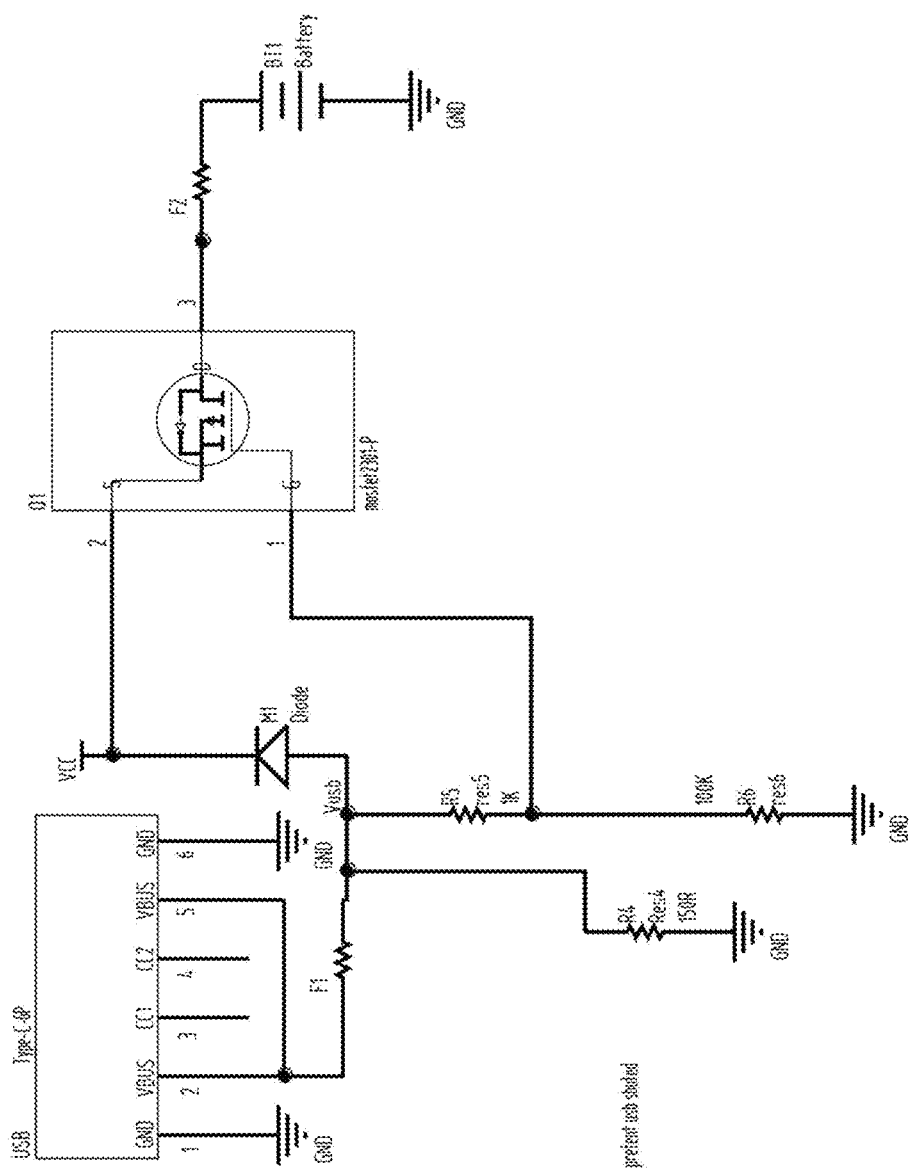
FIG. 5 is a schematic diagram of a protection circuit of the present disclosure when 5V is used for supplying power.
Figure 6:
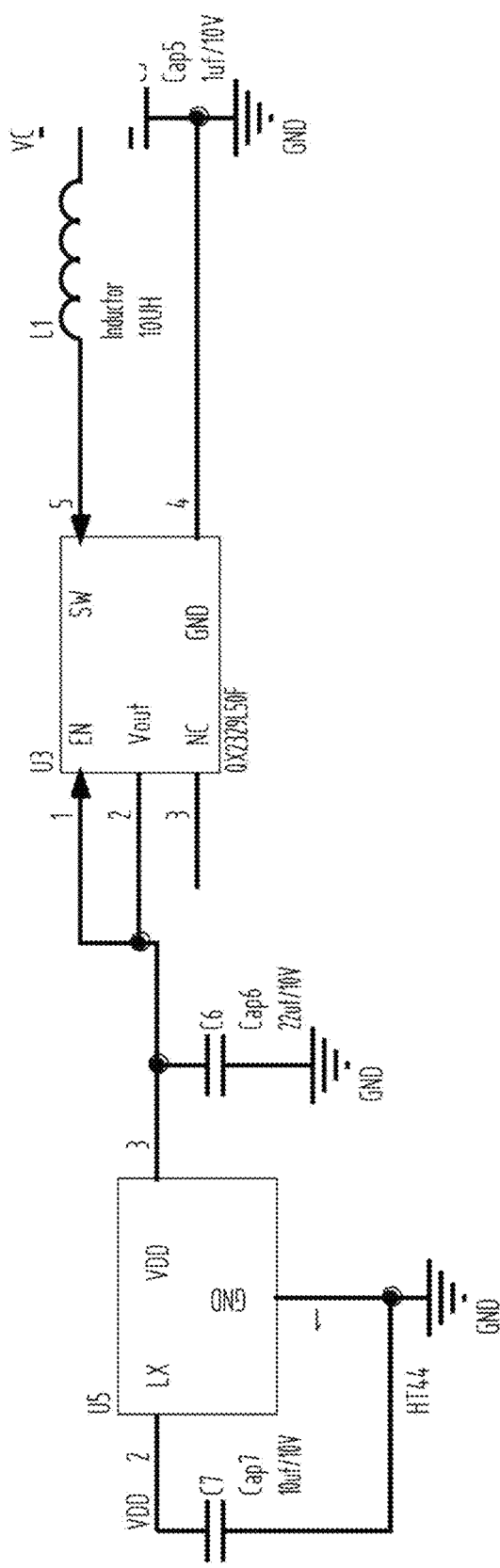
FIG. 6 is a schematic diagram of a radar sensing circuit when 5V is used for supplying power.

As shown in FIG. 4 to FIG. 6, connection conditions of various circuits of the present disclosure when 5V is used for supplying power are shown.

Figure 7:
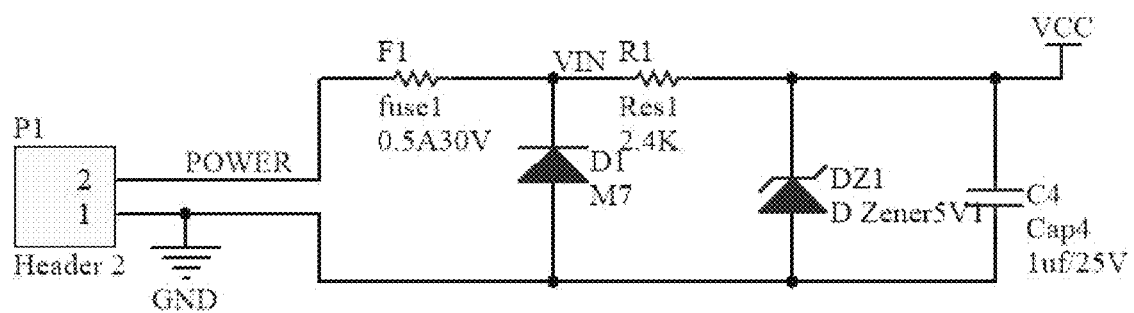
FIG. 7 is a schematic diagram of a power management circuit of the present disclosure when 24 V to 31 V is used for supplying power.
Figure 8:
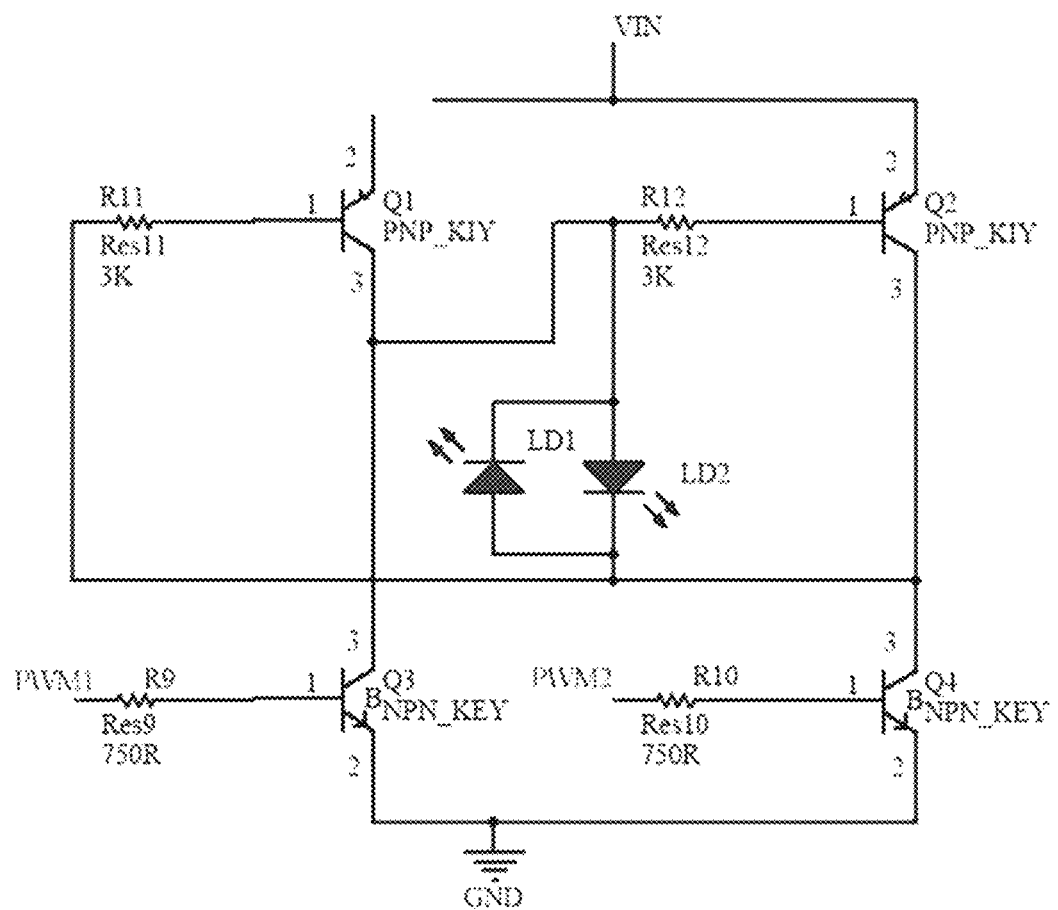
FIG. 8 is a schematic diagram of a light string driving circuit of the present disclosure when 24 V to 31 V is used for supplying power.

The present disclosure further provides a schematic diagram of a circuit when the light string needs to be powered by 24 V to 31 V. A difference from the schematic diagram of the circuit when 5V is used for supplying power is as follows. When 24 V to 31 V is used for supplying power, the power management circuit is as shown in FIG. 7, the light string driving circuit is as shown in FIG. 8.

The controller 1 is provided with a hanging lug 6, so that a user can carry the controller 1, the light strip 2, and the light beads 3 around or mount them in another position through the hanging lug 6. The controller 1 is provided with a control button 5. The control button 5 is respectively connected to the music switching circuit and the power management circuit, respectively corresponding to S1 and S2 in FIG. 4. The control button 5 is pressed by a user to switch the played music, or to turn off the light string 2, the light beads 3 and the music.

The controller 1 is provided with a Type-C charging port 7, so that the controller 1 can be charged.

The above embodiments are only preferred embodiments of the present disclosure, and are not intended to limit the scope of protection of the present disclosure. Therefore, modifications, equivalent changes, improvements, and the like made according to the scope of the application patent of the present disclosure still fall within the scope of the present disclosure.

What is claimed is:

1. A dynamic light-emitting diode (LED) light string capable of playing music, comprising a controller (1), a light strip (2), light beads (3), and a control module (4), wherein a connection seat where the light strip (2) is arranged in a penetrating manner is arranged at a top of the controller (1); the light beads (3) are arranged on the light strip (2) at intervals; the control module (4) is arranged in the controller (1); the control module (4) is electrically connected to the light strip (2) and the light beads (3); the control module (4) comprises a radar sensing circuit, a power management circuit, a light string driving circuit, a music control circuit, and a protection circuit which are arranged on a printed circuit board (PCB) chip; the power management circuit is configured to supply power to other circuits; the radar sensing circuit is configured to sense whether a person is approaching and transmit corresponding electrical signals to the light string driving circuit and the music control circuit through the PCB chip; the light string driving circuit receives the electrical signals from the radar sensing circuit and the music control circuit, converts the corresponding electrical signals into flashing frequencies of the light strip (2) and the light beads (3) through the PCB chip, and outputs the flashing frequencies; the music control circuit is configured to play preset music and adjust a playing volume; the protection circuit is configured to monitor the operation of the power management circuit; and if the power management circuit works abnormally, the supplying of power is cut off;

wherein the music control circuit comprises a music switching circuit and a music playing circuit; the music switching circuit is configured to allow a user to select and switch currently played music; after the music is switched, the light string driving circuit controls and adjusts the corresponding flashing frequencies of the light strip (2) and the light beads (3); the music playing circuit plays a piece of music when receiving an electrical signal indicating a movement of a person; the played music is repeated, and is switched through the music switching circuit; if the movement of the person is beyond a sensing range of the radar sensing circuit, the music playing circuit immediately cuts off the playing of the music; and the music playing circuit further adjusts the volume of the music.

2. The dynamic LED light string capable of playing music according to claim 1, wherein the model number a chip of the music control circuit is DJ01; and the model number of a chip of the light string driving circuit comprises FC2502 and SA6208L.

3. The dynamic LED light string capable of playing music according to claim 2, wherein the controller (1) is provided with a control button (5); the control button (5) is respectively connected to the music switching circuit and the power management circuit; and the control button (5) is pressed by a user to switch the played music, or to turn off the light string (2), the light beads (3) and the music.

4. The dynamic LED light string capable of playing music according to claim 1, wherein the controller (1) is provided with a hanging lug (6).

5. The dynamic LED light string capable of playing music according to claim 4, wherein the controller (1) is provided with a Type-C charging port (7).

6. The dynamic LED light string capable of playing music according to claim 5, wherein there are at least two light strips (2) arranged in parallel or helically into a strand.

* * * * *